United States Patent
Plecis et al.

(10) Patent No.: US 12,270,691 B2
(45) Date of Patent: Apr. 8, 2025

(54) SYSTEM FOR MEASURING THE FLOW RATE OF LIQUID IN A MICROFLUIDIC PIPE

(71) Applicant: ELVESYS, Paris (FR)

(72) Inventors: Adrien Plecis, Bourg-la-Reine (FR); Alexander McMillan, Paris (FR); Guilhem Velve-Casquillas, Paris (FR); Eric Farin, Fontenay-sous-Bois (FR)

(73) Assignee: ELVESYS, Paris (FR)

( * ) Notice: Subject to any disclaimer, the term of this patent is extended or adjusted under 35 U.S.C. 154(b) by 0 days.

(21) Appl. No.: 18/689,828

(22) PCT Filed: Jun. 27, 2022

(86) PCT No.: PCT/EP2022/067493
§ 371 (c)(1),
(2) Date: May 18, 2024

(87) PCT Pub. No.: WO2023/036482
PCT Pub. Date: Mar. 16, 2023

(65) Prior Publication Data
US 2024/0337515 A1    Oct. 10, 2024

(30) Foreign Application Priority Data
Sep. 8, 2021 (FR) .................................. 2109401

(51) Int. Cl.
*G01F 1/36* (2006.01)
*G01F 1/48* (2006.01)
*G01F 1/88* (2006.01)

(52) U.S. Cl.
CPC ............ *G01F 1/48* (2013.01); *G01F 1/363* (2013.01); *G01F 1/88* (2013.01)

(58) Field of Classification Search
CPC .................................. G01F 1/34; G01F 1/88
See application file for complete search history.

(56) References Cited

U.S. PATENT DOCUMENTS

| | | | |
|---|---|---|---|
| 5,515,735 A | 5/1996 | Sarihan | |
| 8,307,845 B2 * | 11/2012 | Kouchi | G01F 1/363 700/282 |

(Continued)

FOREIGN PATENT DOCUMENTS

| | | |
|---|---|---|
| EP | 3030877 A1 | 6/2016 |
| WO | 97/40350 A1 | 10/1997 |
| WO | 2017/125499 A1 | 7/2017 |

OTHER PUBLICATIONS

N.T. Nguyen, "Micromachined flow sensors—a review," Flow Meas. Instrum., Mar. 1997, pp. 7-16, vol. 8, No. 1.

*Primary Examiner* — Erika J. Villaluna
(74) *Attorney, Agent, or Firm* — H&I PARTNERS; Chai Im; C. Andrew Im

(57) ABSTRACT

A system for measuring the flow rate in a microfluidic pipe having n pressure sensors arranged in series on a pipe and measuring the pressure Pi of the liquid passing through same. These sensors being separated from one another by pipe portions Ri. Each pipe portion having a hydraulic resistance Rhi, thus making it possible to measure the pressure variations or head loss ΔPi between two consecutive sensors of the liquid flowing successively through these hydraulic resistances. The comparison between the estimated flow rates Di=ΔPi/Ri, making it possible to determine the fouling of the microfluidic pipe.

8 Claims, 3 Drawing Sheets

(56) References Cited

U.S. PATENT DOCUMENTS

| | | |
|---|---|---|
| 8,403,908 B2 | 3/2013 | Jacobson et al. |
| 9,933,328 B2 * | 4/2018 | Rannow .............. G01M 3/2815 |
| 10,077,999 B2 * | 9/2018 | Shi ......................... G01F 22/00 |
| 10,677,622 B2 | 6/2020 | Le Berre et al. |
| 2005/0054111 A1 | 3/2005 | Breimesser et al. |
| 2014/0208833 A1 | 7/2014 | Berger et al. |
| 2019/0025100 A1 | 1/2019 | Le Berre et al. |

* cited by examiner

SYSTEM FOR MEASURING THE FLOW RATE OF LIQUID IN A MICROFLUIDIC PIPE

RELATED APPLICATIONS

This application is a § 371 application of PCT/EP2022/067493 filed Jun. 27, 2022, which claims priority from French Patent Application No. 2109401 filed Sep. 8, 2021, each of which is incorporated herein by reference in its entirety.

FIELD OF THE INVENTION

The present invention relates to a system for measuring a liquid flow rate in a microfluidic pipe. It also relates to a method for measuring a flow rate in a microfluidic pipe as well as the use of such a system for producing a microfluidic flow rate generator by means of which the liquid flow rate in this pipe can be controlled.

BACKGROUND OF THE INVENTION

Numerous systems for measuring a liquid flow rate in a microfluidic pipe (in which the liquid flow rate is typically between 1 μL/min and 5 ml/min) have been described in the literature. The article titled "micromachined flow sensors-a review" by NT Nguyen published in the journal FLOW MEASUREMENT AND INSTRUMENTATION-March 1997, describes different methods for measuring a liquid flow rate in the range of microfluidic flow rates, that is to say liquid flow rates less than 100 ml/min, and typically between 1 μL/min and 1 ml/min for the majority of applications. The most common methods are based on the use of thermal sensors using the measurement of the displacement of a thermal flux carried by the movement of the liquid.

It is also known to use vibrating sensors based on the Coriolis force to measure the flow rate of fluids such as those marketed under the name Cori-FLOW by the company Bronkhorst.

Patent application WO2017/125499 filed in the name of the company ELVESYS describes a flow rate measurement system using the measurement of the pressure of a gas on the one hand and the measurement of the pressure of a liquid on the other hand.

It is also known, for example from U.S. Pat. Nos. 5,515,735, 8,403,908 or WO9740350, to use two liquid pressure sensors arranged on either side of a microfluidic pipe or a restriction, measuring the pressure drop of the liquid in the microfluidic pipe or the restriction. From this pressure difference measurement, we can easily deduce the flow rate D of an incompressible Newtonian liquid through the microfluidic pipe or the restriction using the formula:

$$D=(P1-P2)/Rh$$

P1 being the pressure of the liquid upstream of the pipe or restriction, P2 being the pressure of the liquid downstream of the pipe or restriction and Rh being the hydraulic resistance of the pipe or restriction between the two upstream and downstream measurement points for the liquid pressure. Hydraulic resistance is measured for water at a temperature of 20° C. In the case of other fluids, an equivalent hydraulic resistance can be deduced using the ratio of the dynamic viscosities of the liquid introduced into the pipe to the viscosity of water at 20° C. Hydraulic resistance can either be deduced from the geometry of the pipe in the case of simple pipes (cylindrical section), or calibrated with the help of a flow rate generator (for example a syringe pump) and by measuring the pressure drop on either side of the pipe with an imposed constant flow rate.

In these systems, and provided that the hydraulic resistance is known, the flow rate measurement is thus calculated for example with the help of a specially configured computer to which the measured values of P1, P2 and the known or calibrated value of Rh are transmitted and which delivers an electrical signal proportional to D.

All currently known systems for measuring a flow rate in a microfluidic pipe, whatever their operating principle, are faced with the problem of blockage due to clogging of the microfluidic pipes and blockage of the flow of the liquid. Clogging (i.e. the deposition of material or debris within the liquid flow path) can compromise the accuracy or functionality of the system by changing the flow dynamics and therefore the hydraulic resistance of the pipe in the case of differential-pressure flow measurement systems or the thermal propagation dynamics in the case of thermal flow sensors. Although certain precautions and/or cleaning protocols can resolve this problem more or less well, a clogging situation for a microfluidic pipe can be difficult to detect and can thus lead to wrong measurements without the user's knowledge, particularly during experiments or long uses during which cleaning procedures cannot be applied. In addition, and despite the application of cleaning procedures, certain sensors are no longer able to offer a valid measurement value because the clogging has permanently modified the dynamics of the sensor and they become de facto unusable.

OBJECT AND SUMMARY OF THE INVENTION

The invention permits to solve the problem of clogging of micro-fluidic pipes and restrictions in liquid flow rate measurement systems leading to wrong measurements without the user's knowledge by proposing a flow measurement system capable of measuring the effect of this clogging.

The invention also aims to propose a flow rate measurement system capable of alerting the user when a progressive blockage occurs and offering reliable flow rate measurement despite a partial clogging of the flow rate sensor.

Finally, the invention proposes to be robust to homogeneous clogging which is particularly difficult to detect and to allow the use of analog measuring systems or even flow rat control with the help of a pressure generator.

For this purpose, the object of the invention is a flow rate measurement system in a microfluidic pipe characterized in that it comprises n pressure sensors Ci (C1, C2, . . . . Cn), with n greater than or equal to 3, arranged in series on the pipe and measuring the pressure of the liquid through them, these sensors being separated from each other by n−1 portions of pipe Ri (R1, R2, . . . , Rn−1) each having a hydraulic resistance Rhi (Rh1, Rh2, . . . , Rhn−1), the pressure sensors measuring the pressure Pi (P1, P2, . . . , Pn) of the liquid through them respectively, as well as a processor-based computer (10) specially configured for:
- measuring the pressure variations or pressure losses $\Delta P_i$ ($\Delta P_1$, $\Delta P_2$, $\Delta Pn-1$) between two successive pressure sensors Ci and Ci+1,
- calculating the liquid flow rate Di (D1, D2, . . . , Dn−1) in the pipe portion Ri, and
- calculating the proportional difference in flow rate $\Delta Dk,j$ between two values Dk and Dj among the flow rate values Di.

According to one embodiment of the invention, the specially configured computer is capable of calculating the average of the flow rates Dmean of the flow rate values Di.

According to one embodiment of the invention, the computer comprises blockage detection means for generating an alert signal when a proportional difference ΔDk,j between any two values Dk and Dj among all the values Di is greater than a threshold value ΔDthreshold, this signal indicating a partial blockage and/or clogging of the microfluidic pipe.

According to one embodiment of the invention, the specially configured computer is capable of calculating the average of flow rates Dmean over the largest set of Di such that any two flow rates Dj and Dk of this set have a lower proportional difference in flow rate ΔDk,j at ΔDthreshold.

According to one embodiment of the invention, at least one of the pipe portions Ri has a hydraulic diameter different from that of the other pipe portions.

According to one embodiment of the invention, two pipe portions Ri have a hydraulic diameter ratio greater than or equal to 2.

The invention also relates to a method for measuring the blockage of a microfluidic pipe characterized in that it comprises the step of circulating the fluid through n−1 (n being greater than or equal to 3) portions of microfluidic pipe Ri, arranged in series and each having a hydraulic resistance (Rhi, respectively), a pressure sensor Ci being arranged respectively at the two ends of each portion of microfluidic pipe configured in series so as to measure the pressure variations ΔPi between the two sensors of pressure at both ends of the i-th portion of microfluidic pipe Ri and then the step of calculating the flow rate Di in each portion of pipe according to the relationship:

$$Di = \Delta Pi / Rhi$$

as well as the proportional differences in flow rate ΔDk,j, according to the relationship:

$$\Delta Dk, j = |Dk - Dj| / ((Dk + Dj)/2)$$

said method being able to calculate the average value of the flow rates Dmean according to the relationship:

$$Dmean = \sum (Di)/(n-1)$$

For example, ΔP1 between the first sensor C1 and the second sensor C2 gives D1, provided that the hydraulic resistance Rh1 of the first portion of pipe R1 is known, and ΔP2 between the second sensor C2 and the third pressure sensor C3 gives D2, provided that the resistance hydraulic Rh2 of the second portion of pipe R2 is known, the comparison of the different values of Di making it possible to determine the clogging or blockage of the pipe.

According to one implementation of the invention, the proportional difference ΔDk,j between any two values Dk and Dj among the set of flow values Di being compared to a predetermined set point value ΔDthreshold, an alert signal is generated when at least one ΔDk,j becomes greater than ΔDthreshold indicating a blockage of one of the two portions of microfluidic pipe. In the case where a blockage is not detected, the average value of the liquid flow rate Dmean is calculated with Dmean=Σ(Di)/(n−1) in order to subsequently deduce the instantaneous flow rate of the fluid.

According to one implementation of the invention, the largest subset of Di is determined such that any two flow rates of this subset Dk and Dj present a proportional difference in flow rate ΔDk,j less than ΔDthreshold and the average flow rate Dmean is then calculated on this flow subset.

According to one implementation of the invention, the average flow rate value Dmean of the liquid flow rate is used by a control subassembly of a processor-based computer specially configured to generate a pressure set point P usable to regulate the liquid flow rate.

BRIEF DESCRIPTION OF THE DRAWINGS

The invention will be better understood with the help of the following exemplary embodiments, given without limitation, together with the figures which represent it in the particular case of three pressure sensors and two portions of pipe (n=3).

Identical, similar, or analogous elements have the same reference from one figure to another.

DETAILED DESCRIPTION OF THE EMBODIMENTS

Figure 1A:
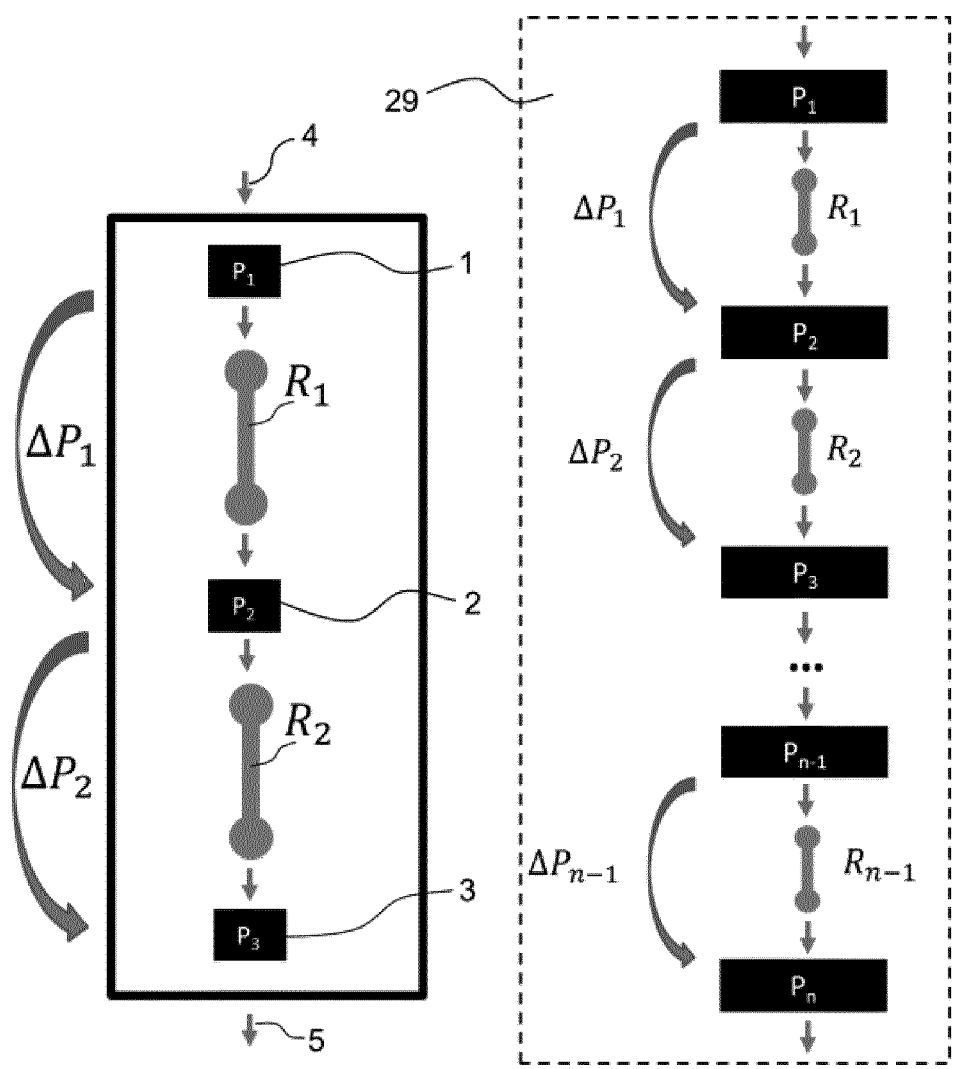
FIG. 1A is a schematic illustration of the system and method according to the invention.

FIG. 1A schematically represents a module illustrating the principle underlying the system and method according to the invention. In FIG. 1A, a liquid flow rate 4 is sent into the microfluidic channel R1 through the pressure sensor 1 at the inlet of R1 then recovered at the outlet of R1 after passing through the pressure sensor 2. The microfluidic channels R1 and R2 are connected in series, R2 being connected to the output of the sensor 2 so as to recover the liquid flow rate from R1 and lead it to the pressure sensor 3 then to the liquid outlet 5. In this embodiment, the pipe portions R1, R2 are thus produced with the help of microfluidic channels.

By means of a specially configured processor-based computer 10, the pressure differences ΔP1 and ΔP2 are measured between respectively the two ends of the microfluidic channels R1 and R2 having a common end at the sensor 2 and used to calculate the flow rate values of the fluid D1 and D2 in the channels R1 and R2, respectively. Under normal circumstances, in which no clogging and/or blockage of the microfluidic channels R1 and R2 has occurred, the two fluid flow rate values D1 and D2 will be equal. On the other hand, if there is a partial blockage and/or clogging of the device, this will produce a proportional difference ΔD=|D2−D1|/((D2+D1)/2) between the two calculated fluid flow rate values (D1≠D2) due to the change in effective hydraulic resistance of the affected channel, from which the fluid flow rate is calculated. This proportional difference ΔD will be calculated with the help of the computer 10 specially configured to calculate ΔP1, ΔP2, D1 and D2 from the pressure measurements from the sensors, then compare ΔD to a set value ΔDthreshold, and generate a signal alarm (optical, electrical, mechanical, etc.) which will be operated by the user, so as to allow him, if he wishes, to clean in order to measure the liquid flow rate more accurately in the microfluidic pipe circuit.

Of course, there are different possible formulas for calculating the proportional difference in flow rate which are within the reach of those skilled in the art, in particular that according to which the difference in flow rates Dk–Dj is divided by the sum of the flow rates only or more generally by X or a 1/X times the sum of the flow rates (X being an integer).

Figure 1B:
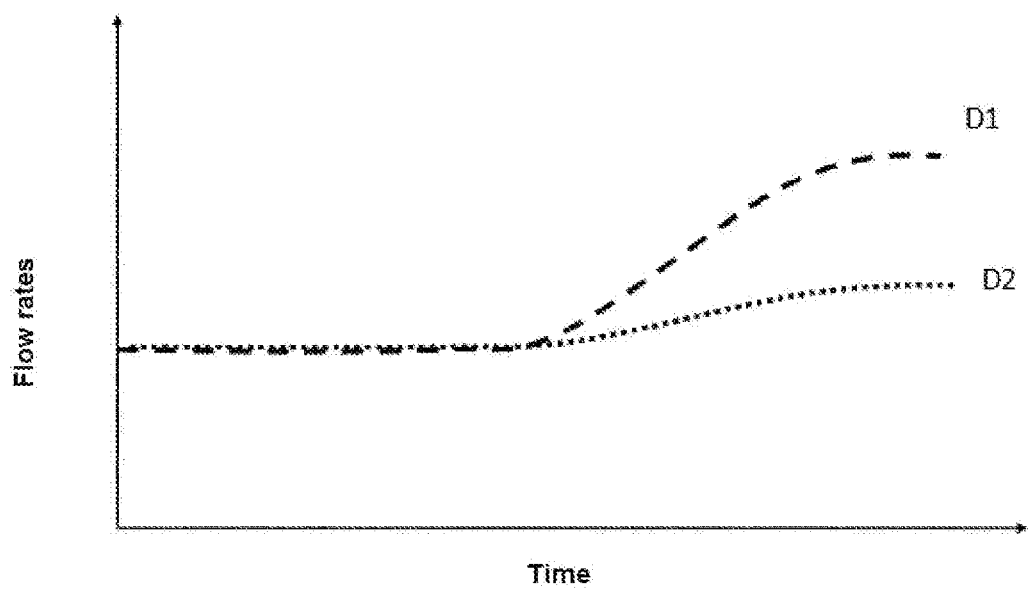
FIG. 1B a graphical representation of flow rate curves inside two pipe portions in FIG. 1A.

Indeed, when a liquid containing debris is injected into successive pipe portions, the first pipe portions upstream of the liquid flow tend to be blocked more quickly than the pipe portions downstream of the flow. This partial blocking of the first pipe portions causes the hydraulic resistance Rhi of the first pipe portions to increase more quickly than those located downstream of the flow. Thus, we can see in the flow rate curve in FIG. 1B that clogging of the portion R1 leads to a virtual increase in the flow rate D1 relative to D2 over time, which alerts the user that the flow measurement is probably wrong. This invention therefore allows the user to check the consistency of the successive flow rates measured in the restrictions to ensure that a blockage does not occur in the system at a pipe portion.

In the case where the clogging was due to the continuous deposition of a layer of material onto the walls of the channel, it is nevertheless possible that the hydraulic resistances vary concomitantly and therefore that the user is not able to see the clogging of pipes when comparing the flow rate values. In this case, it will be preferable to use channels with different hydraulic diameters. By "hydraulic diameter" it is meant the equivalent diameter that a circular pipe with an equivalent pressure loss would have.

As the hydraulic resistance varies non-linearly with the hydraulic diameter of a pipe, opting for pipes with different hydraulic radii will allow, in the event of homogeneous clogging of the walls (linear reduction over time of the hydraulic diameter), to increase the hydraulic resistance and therefore the flow rate measured much more quickly in the pipe having a smaller hydraulic diameter. In particular, the use of two pipes, one of which has a hydraulic diameter at least 2 times smaller than the other, will make it possible to distinguish a homogeneous clogging, that is constant over time, with certainty by causing a relative variation in hydraulic resistance at least twice higher for the smaller hydraulic diameter pipe than for the larger hydraulic diameter pipe. We will thus detect flow rate difference of the order of the error caused by a homogeneous clogging. In the case of a microfluidic application, we could for example use two capillaries in series with respective internal diameters of 50 µM and 150 µm or two micro-channels of rectangular section, of constant height for example of 100 µm and respective widths of 50 µm and 200 µm, to achieve these two pipe sections with significantly different hydraulic resistance.

If, however, equivalent clogging was to modify the hydraulic resistances in several pipe portions in a similar manner, it will then be preferable to increase the number of these pipe portions and the pressure sensors. This general diagram is represented in FIG. 1A by the element 29 with n pressure sensors and n–1 pipe portions arranged in series. By multiplying the number of flow rates measured for each of the n–1 portions, the probability of having concomitant equivalent clogging is reduced and the user will therefore benefit from an even more reliable flow sensor.

If the hydraulic resistance of the n–1 pipe portions is not known, or varies according to the manufacturing method, it will be possible for the operator to carry out a calibration step by injecting a clean liquid (ultrapure water) at a known flow rate (for example with the help of a syringe pump) and measure with the computer the response of the n pressure sensors so as to deduce the pressure drop and therefore the hydraulic resistance of each of the n–1 pipe portions. These hydraulic resistances can thus be stored in the computer memory to be used when measuring an unknown flow rate. Likewise, if a flow rate sensor has suffered a partial blockage of one of its pipes, the initial calibration step will correct the resistances of the contaminated flow rate sensor to allow subsequent reuse, for example after a cleaning step. This will therefore allow the user to make substantial savings because s/he can reuse a sensor that has been partially contaminated.

Figure 2:
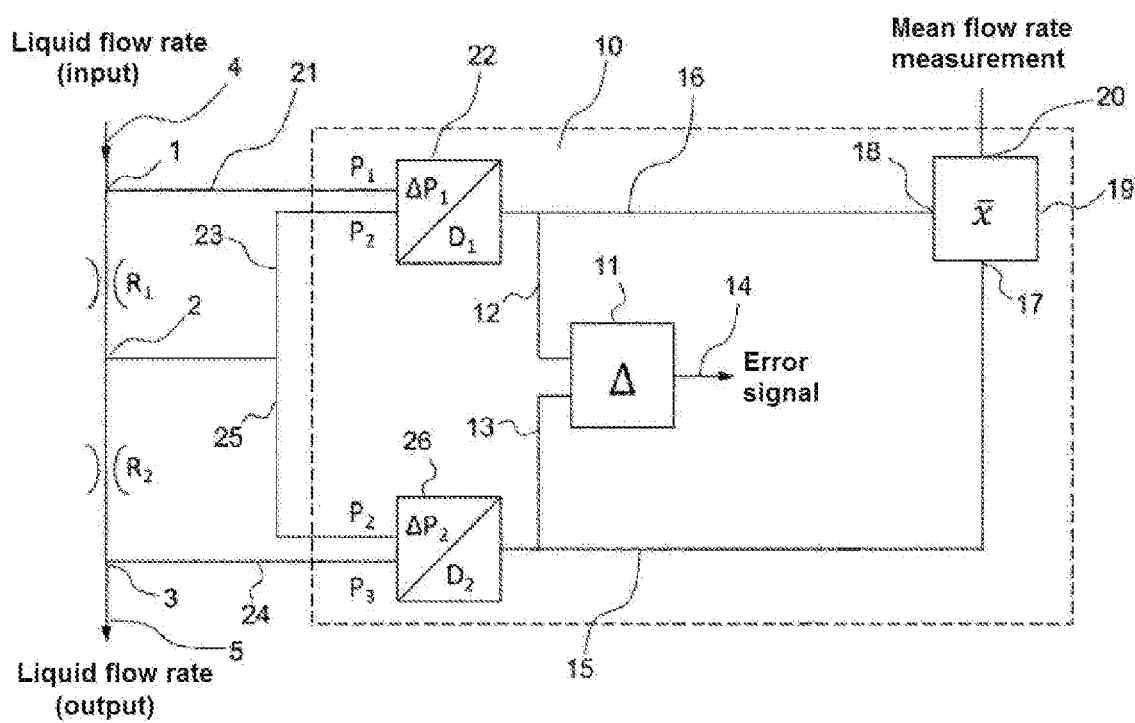
FIG. 2 is a diagram of an example of the microfluidic flow rate system according to the invention.

FIG. 2 represents an exemplary embodiment of the microfluidic rate flow system according to the invention. The flow rate of microfluidic liquid 4 arrives at the first pressure sensor 1. This delivers a measurement of the pressure P1 via the connection 21 to the computer 10 specially configured to measure with the subassembly 22 the pressure difference $\Delta P1$ between the pressure P1 and the pressure P2 measured with the help of the pressure sensor 2 at the outlet of the microfluidic pipe R1 then calculate the flow rate of the fluid D1 in the pipe R1, transmitted to the computer 10 by the connection 23. The subassembly 22 transmits the value D1 via the connection 12 to the blockage detector subassembly 11.

The microfluidic liquid from R1 at the sensor 2 then flows in the microfluidic pipe R2 to the third pressure sensor 3 and the liquid flow output 5. The pressure sensor 3 delivers via the connection 24 a pressure signal P3 to the subassembly 26 similar to the subassembly 22 while the sensor 2 is also connected via the connection 25 to the subassembly 26 to which it also delivers a pressure signal P2, the subassembly 26 transmitting the value D2 via the connection 13 to the blockage detector subassembly 11, which calculates the proportional difference of the flow rate values $\Delta D$ (from D1 and D2) and compares it with $\Delta Dthreshold$.

The computer is then able to deliver an alert signal 14 to the operator in the event that this maximum threshold is of exceeded. This alert makes it possible in particular to avoid leaving the initiative to the operator to assess the moment when the flow rates are too different and makes the use of this type of sensor more robust, particularly in production lines. The computer will also be able to carry out any form of signal processing and analysis of (averaging, integral, derivative) to detect a drift below the alert threshold but making it possible to prevent a future error and trigger preventive maintenance on the flow rate sensor.

The value D2 is also sent via the connection 15 to the input 17 of the subassembly 19 which also receives on its input 18 the value D1 via the connection 16, the computer 10 performing thanks to its subassembly 19 the average of the amplitudes of D1 and D2 and delivering at the output 20 a measurement of the average flow rate of the microfluidic liquid, more precise than D1 and D2: this is also one of the advantages of the invention for which the values D1 and D2 have a double detection function of a pipe blockage and measurement of an average flow rate. It should also be noted that the operator may prefer to configure the alert at the computer level so that it is triggered when the absolute value of the flow rate difference is greater than an absolute threshold, for example 1 µL/min, for a sensor that must operate over a range from 0 to 100 µL/min.

Figure 3:
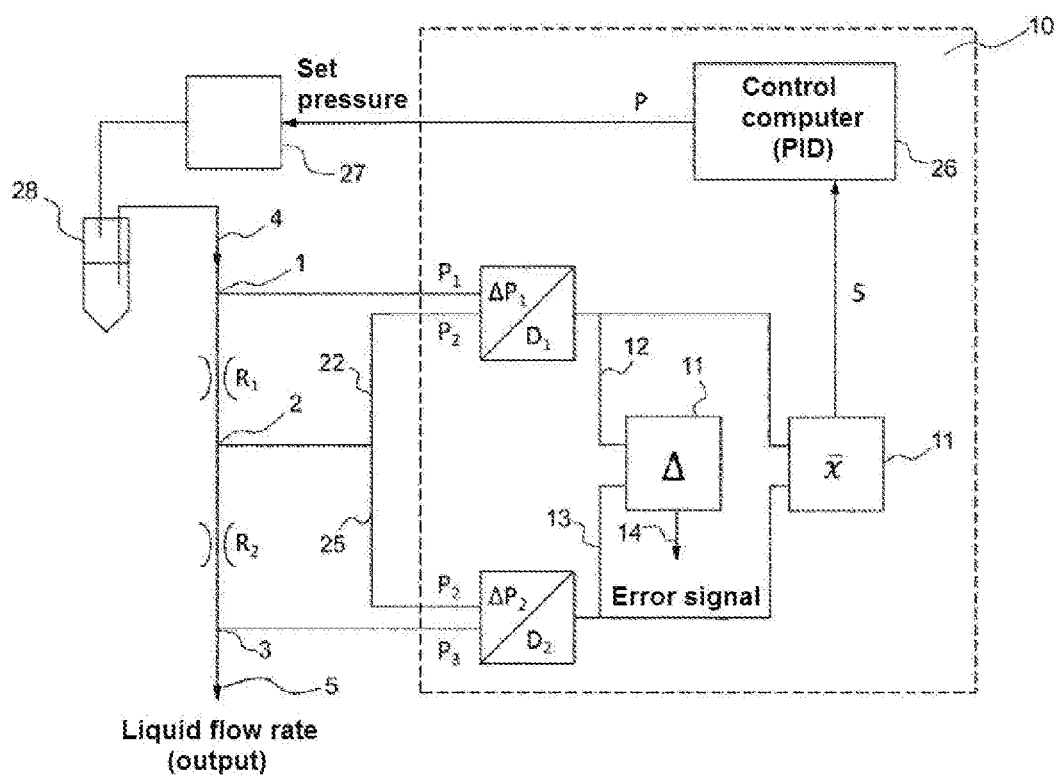
FIG. 3 represents another embodiment of the invention.

FIG. 3 shows an exemplary embodiment of the invention in which the measurements of pressure variations $\Delta P1$ and $\Delta P2$ are used, hence the variations in flow rate of the fluid rate D1 and D2, to generate a signal S representing the average flow rate in the microfluidic pipe in the case where a blockage is not detected by the blockage detector subassembly 11. This signal S is used by a control device 26 (subassembly of the computer 10) of the PID type (for Proportional Integral Derivative) in order to generate a desired pressure signal P to a pressure controller 27 (for example the Elveflow OB1 controller) which will control the pressure of the gaseous upper part in the reservoir 28 for the liquid injected into the microfluidic pipe 4, thus making it possible to control the flow rate of the microfluidic liquid.

The measurement S of the flow rate sensor can thus be used to quickly read the liquid flow rate at a given instant and be entered into a PID control loop in order to adjust the pumping pressure applied in the reservoir 28, and thus control the flow rate in the microfluidic system.

Preferably, the pressure detector at the downstream end of a pipe portion Ri is the same as the pressure detector at the inlet of the successive pipe portion Ri+1, that is to say, there is preferably a single pressure sensor between two portions of successive hydraulic resistances.

The invention works by continuously reading the integrated pressure sensors and calculating the values $\Delta Pi$ and $Di$ with the help of a specially configured processor-based computer.

Before the values Di are averaged, the difference between them is calculated. If the proportional difference $\Delta Dk,j$ between any two flow rate values Dk and Dj among all the values Di is greater than $\Delta Dthreshold$ (for example, 2%), it is probable that the clogging or blockage of the flow path of the micro-channel is present. This threshold is determined by the cumulative error of successive pressure sensors (e.g. measurement accuracy $\pm 0.2\%$), whose signals constitute the calculation of an $\Delta Pi$ and a Di, in addition to any uncertainty linked to the dimensions of the integrated micro-channels (e.g.: a dimensional tolerance of $\pm 0.5\%$ of the micro-machining process, because the accuracy of the flow rate calculation also depends on the accuracy of the dimensions of the micro-channels). In cases where the maximum difference between the fluid flow rate values $\Delta$ exceeds this threshold, for example a LED light outside the sensor will turn on (controlled by the specially configured computer) to indicate the probable blockage to the user. Preferably the specially configured computer will deliver a warning message suggesting the user to perform a sensor cleaning protocol to resolve the clogging problem.

These arithmetic operations (to determine the values $\Delta Pi$, $Di$, $\Delta Dk,j$ and $Dmean$) will be carried out several times per second by the specially configured computer and then communicated to a software interface for controlling and recording data (not shown on the figures).

The invention claimed is:

1. A flow rate measurement system in a microfluidic pipe, comprising:

n pressure sensors, with n greater than or equal to 3, arranged in series on the microfluidic pipe to measure a pressure of a liquid through the n pressure sensors, the n pressure sensors being separated from each other by n−1 pipe portions of the microfluidic pipe, each pipe portion having a calibrated hydraulic resistance Rhi, respectively, each pressure sensor measures the pressure of the liquid through said each pressure sensor, a pressure sensor is arranged respectively at the two ends of said each pipe portion of the microfluidic pipe configured in series to measure pressure variations $\Delta Pi$ between two pressure sensors at both ends of an i-th portion of the microfluidic pipe; and a processor-based computer specially configured to:
measure pressure variations or pressure losses between two successive pressure sensors;
calculate an apparent liquid flow rate Di in said each pipe portion according to the following relationship:

$$Di = \Delta Pi / Rhi;$$

calculate a proportional difference $\Delta Dk,j$ in the apparent liquid flow rates between two pipe portions according to the following relationship:

$$\Delta Dk, j = |Dk - Dj| / ((Dk + Dj)/2);$$

comparing the proportional difference in the apparent liquid flow rates between any two pipe portions to a threshold value; and
wherein the processor-based computer further comprises a blockage detector configured to generate an alert signal when the proportional difference in the apparent liquid flow rates between any two pipe portions is greater than a threshold value, the alert signal indicating at least one of a partial blockage and a clogging of the microfluidic pipe.

2. The system of claim 1, wherein the processor-based computer is configured to calculate an average of the apparent liquid flow rates.

3. The system of claim 1, wherein the processor-based computer is configured to calculate an average of the apparent liquid flow rates over a largest set of the apparent liquid flow rates such that any two flow rates of the largest set have a lower proportional difference in the apparent liquid flow rate than the threshold value.

4. The system of claim 1, wherein at least one of the pipe portions has a hydraulic diameter different from that of the other pipe portions.

5. The system of claim 4, wherein two pipe portions have a hydraulic diameter ratio greater than or equal to 2.

6. A method for measuring a blockage of a microfluidic pipe, comprising:

circulating a fluid through n−1 pipe portions of the microfluidic pipe, n being greater than or equal to 3, arranged in series and each pipe portion having a calibrated hydraulic resistance Rhi, respectively, a pressure sensor among n pressure sensors being arranged respectively at the two ends of said each pipe portion of the microfluidic pipe configured in series to measure pressure variations $\Delta Pi$ between two pressure sensors at both ends of an i-th portion of the microfluidic pipe;
calibrating by injecting a clean liquid at a predetermined flow rate and measuring responses of the n pressure sensors with a processor-based computer to determine a pressure drop and to determine the calibrated hydraulic resistance Rhi of each of the n−1 pipe portions;
calculating an apparent liquid flow rate Di in said each pipe portion according to the following relationship:

$$Di = \Delta Pi / Rhi;$$

calculating a proportional difference $\Delta Dk,j$ in the apparent liquid flow rates, according to the following relationship:

$$\Delta Dk, j = |Dk - Dj| / ((Dk + Dj)/2);$$

calculating an average of the apparent liquid flow rates Dmean according to the following relationship:

$$Dmean = \sum (Di)/(n-1);$$

and comparing the proportional difference in the apparent liquid flow rates between any two pipe portions to a threshold value; and generating alert signal when at least one proportional difference is greater than the threshold value indicating a blockage of one of the two portions of microfluidic pipe.

7. The method of claim 6, further comprises determining a largest subset of the apparent liquid flow rates such that the proportional difference between any two apparent liquid flow rates of the largest subset is less than the threshold value; and calculating an average of the largest subset of the apparent liquid flow rates.

8. The method of claim 6, further comprises generating a pressure set point to regulate the apparent liquid flow rate in said each pipe portion by a controller in accordance with the average of the apparent liquid flow rates.

\* \* \* \* \*